US012657899B2

(12) United States Patent
Todri-Sanial

(10) Patent No.: US 12,657,899 B2
(45) Date of Patent: Jun. 16, 2026

(54) METHOD FOR RECOGNIZING A PATTERN IN AN IMAGE AND ASSOCIATED DEVICES

(71) Applicants: CENTRE NATIONAL DE LA RECHERCHE SCIENTIFIQUE, Paris (FR); UNIVERSITE DE MONTPELLIER, Montpellier (FR)

(72) Inventor: Aida Todri-Sanial, Prades-le-Lez (FR)

(73) Assignees: CENTRE NATIONAL DE LA RECHERCHE SCIENTIFIQUE, Paris (FR); UNIVERSITE DE MONTPELLIER, Montpellier (FR)

( * ) Notice: Subject to any disclaimer, the term of this patent is extended or adjusted under 35 U.S.C. 154(b) by 391 days.

(21) Appl. No.: 18/263,866

(22) PCT Filed: Jan. 31, 2022

(86) PCT No.: PCT/EP2022/052217
§ 371 (c)(1),
(2) Date: Aug. 1, 2023

(87) PCT Pub. No.: WO2022/162222
PCT Pub. Date: Aug. 4, 2022

(65) Prior Publication Data
US 2024/0119718 A1 Apr. 11, 2024

(30) Foreign Application Priority Data
Feb. 1, 2021 (EP) ..................................... 21305133

(51) Int. Cl.
*G06V 10/82* (2022.01)
*G06V 10/94* (2022.01)
(52) U.S. Cl.
CPC .............. *G06V 10/82* (2022.01); *G06V 10/94* (2022.01)

(58) Field of Classification Search
CPC ... G06V 10/82; G06V 10/94; G06F 18/24143
See application file for complete search history.

(56) References Cited

U.S. PATENT DOCUMENTS 8,224,604 B1 * 7/2012 Amrutur ............ G01R 31/3016
702/89
11,283,405 B2 * 3/2022 Chan ........................ H03B 5/04
(Continued)

FOREIGN PATENT DOCUMENTS

CN 102332915 A * 1/2012

OTHER PUBLICATIONS

Csaba G, Ytterdal T, Porod W. Neural network based on parametrically-pumped oscillators. In2016 IEEE International Conference on Electronics, Circuits and Systems (ICECS) Dec. 11, 2016 (pp. 45-48). IEEE.*
(Continued)

*Primary Examiner* — Xuemei G Chen
(74) *Attorney, Agent, or Firm* — HAUPTMAN HAM, LLP

(57) ABSTRACT
A method for recognizing a pattern in an image including a training phase of an oscillatory neuron network, the oscillatory neuron network being adapted to output a pattern when an image is inputted, the oscillatory neuron network being implemented by a circuitry comprising oscillators linked by interconnections including at least one coupling resistance having a coupling resistance value, the oscillators being coupled by a sub-harmonic injection technique and coding the output by their relative phase difference, the coupling resistance values being learnt during the training phase by using Hebbian learning rules, and an operating phase wherein the trained oscillatory neuron network is used to recognize a pattern in an image, at least one of the training phase and the operating phase being computer-implemented.

12 Claims, 5 Drawing Sheets

(56) References Cited

U.S. PATENT DOCUMENTS

| | | | | |
|---|---|---|---|---|
| 2007/0096833 A1* | 5/2007 | Maurer | .................. | H03L 7/091 |
| | | | | 331/1 A |
| 2016/0373055 A1* | 12/2016 | Kumar | .................... | H03B 5/06 |
| 2021/0116781 A1* | 4/2021 | Hughes | ................... | H03K 3/42 |
| 2022/0004876 A1* | 1/2022 | Karg | ...................... | G06N 3/063 |
| 2022/0007490 A1* | 1/2022 | Claus | .................. | H05H 1/4652 |
| 2022/0337017 A1* | 10/2022 | Michailovas | ......... | H01S 3/0057 |

OTHER PUBLICATIONS

Xu et al., Yubing, Sub-harmonic Injection Locking Memristor-based Oscillator Arrays Used for Pattern Recognition. In: 2019 IEEE International Workshop on Future Computing (IWOFC. IEEE, 2019. p. 1-3.

Maffezzoni et al., P., (2015), Oscillator array models for associative memory and pattern recognition, IEEE Transactions on Circuits and Systems I: Regular Papers, 62(6), 1591-1598.

Corti et al., E., (2020). Time-Delay Encoded Image Recognition in a Network of Resistively Coupled $VO_2$ on Si Oscillators. IEEE Electron Device Letters, 41(4), 629-632.

Chien, Jun-Chau et al., Oscillator-based reactance sensors with injection locking for high-throughput flow cytometry using microwave dielectric spectroscopy. IEEE Journal of Solid-State Circuits, 2015, vol. 51, No. 2, p. 457-472.

Razavi, Behzad, A study of locking phenomena in oscillators. Journal of Solid-State Circuits, 2004, vol. 39, No. 9, p. 1415-1424.

International Search Report and Written Opinion issued in corresponding International Application No. PCT/EP2022/052217, dated Apr. 12, 2022, pp. 1-9, European Patent Office, Rijswijk, Netherlands.

* cited by examiner

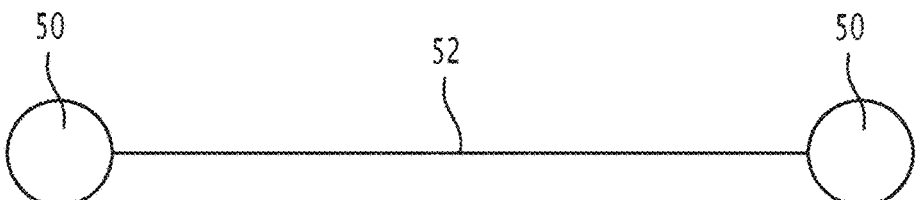
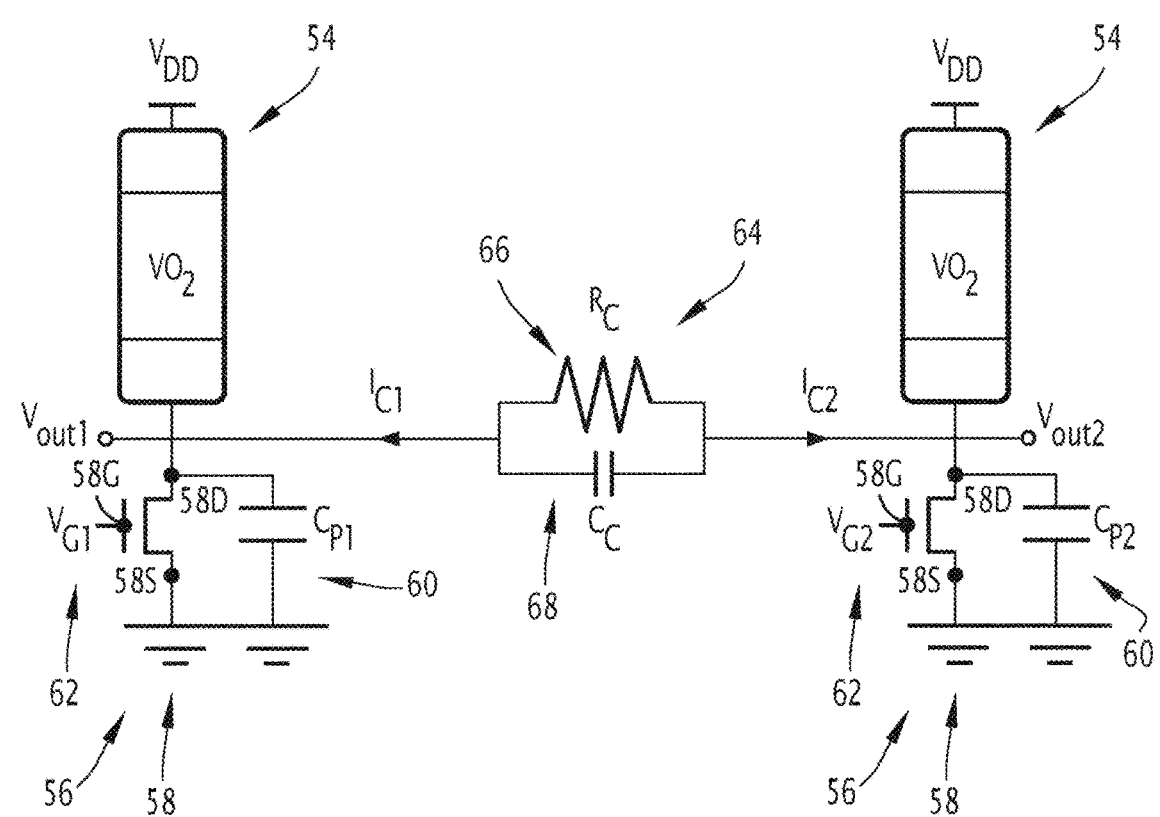
<u>FIG.2</u>

METHOD FOR RECOGNIZING A PATTERN IN AN IMAGE AND ASSOCIATED DEVICES

The present application is a U.S. National Phase of International Application Number PCT/EP2022/052217, filed Jan. 31, 2022, which claims priority to European Application No. 21305133.7, filed Feb. 1, 2021.

TECHNICAL FIELD OF THE INVENTION

The present invention concerns a method for recognizing a pattern in an image. The present invention also concerns a computer program product and a computer-readable medium involved in the method for recognizing.

BACKGROUND OF THE INVENTION

Pattern recognition is the automated recognition of patterns and regularities in data. Pattern recognition has applications in many areas such medicine with analysis of the presence of tumorous cells in an image, transport notably for identifying elements in the environment or security with fingerprint recognition.

Pattern recognition is generally categorized according to the type of learning procedure used to generate the output value.

Supervised learning assumes that a set of training data (the training set) has been provided, consisting of a set of instances that have been properly labeled by hand with the correct output. A learning procedure then generates a model that attempts to meet two sometimes conflicting objectives: perform as well as possible on the training data, and generalize as well as possible to new data.

Unsupervised learning, on the other hand, assumes training data that has not been hand-labeled, and attempts to find inherent patterns in the data that can then be used to determine the correct output value for new data instances.

A combination of the two that has recently been explored is semi-supervised learning, which uses a combination of labeled and unlabeled data (typically a small set of labeled data combined with a large amount of unlabeled data). Note that in cases of unsupervised learning, there may be no training data at all to speak of; in other words, the data to be labeled is the training data.

Due to the large amount of data required and thus calculation, the physical implementation of the previously mentioned methods requests more and more calculation units.

One way to fabricate such calculation units is to use a CMOS (Complementary metal-oxide-semiconductor) implementation.

Indeed, innovations in CMOS technology and the continuous scaling roadmap of transistors outlined by Moore's prediction has enabled today's powerful computers and handheld devices. Mere miniaturization of devices was initially sufficient to reduce the area and power requirements of transistors, yet for sub-100 nanometers (nm) technology nodes, this was not enough. Two main paths were taken 1) to change the device materials to reduce its parasitics, and 2) change the device geometry for better channel control. First, the metal gates and high-K oxides were introduced to improve the transistor performance. Such material level improvement eventually led to a structural change and the introduction of new gate geometry such as fin field-effect transistors (FinFET). FinFETs allowed controlling the channel from three sides. Recently, TMSC has announced volume production as of 2020 of its 5 nm gate-all-around FinFET transistors made available by EUV process technology and with a target to start production of 3 nm node by 2022.

Nevertheless, despite the advancements in the transistor device and fabrication technologies, CMOS is facing physical barriers—as scaling is approaching a fundamental physical limit with the transistor channel length becoming comparable to the size of a handful of atoms. Such channel lengths lead to significant leakage currents and suffer from lower yield due to high process variations. Consequently, this would translate to more power consumption and more expensive chips, that would be an overkill to what Moore's law has been promising so far. At this point, the scientific and industrial community has focused on developing novel devices that go beyond CMOS transistors. Emerging memories such as magnetic and phase change (PCRAM, RRAM, STT-RAM), and new transistor technologies such as tunnel, negative capacitance and 1D/2D channel material (TFET, NC-FET, CNT-FET/MOS$_2$-FET) are being investigated as potential solutions to extend the performance and capacity of Von Neumann computing paradigm.

Despite the on-going research on novel device geometries and channel materials, there is a tremendous effort on exploring innovative non-Von Neumann computing architectures to meet the requirements of data-centric applications. In the classical von Neuman architecture, data moves from memory to the processor, which for processing large datasets becomes infeasible as a large amount of power is consumed in data movement, hence, arises the memory-wall problem. This problem is exacerbated for pattern recognition.

Non-Von Neumann architectures like brain-inspired architectures based on neural networks have drawn a lot of interest as more understanding of how the brain and neurons work is gained. Neural networks aim to mimic the parallelism of the brain and their implementation in resource-intensive hardware such as GPUs have revolutionized AI applications. For example, current CMOS implementations of neural networks such as Google's Tensor Processing Unit can offer up 86× more computations per watt. Even though these systems are more power-efficient compared to a CPU due to their architecture, the CMOS implementations of neural networks will eventually face the problems as described earlier.

SUMMARY OF THE INVENTION

There is therefore a need for a method for recognizing a pattern in an image involving less resources.

To the end, the specification describes a method for recognizing a pattern in an image, the method comprising a training phase of an oscillatory neuron network, to obtain a trained oscillatory neuron network, the oscillatory neuron network being adapted to output a pattern when an image is inputted, the oscillatory neuron network being implemented by a circuitry comprising oscillators linked by interconnections comprising at least one coupling resistance having a coupling resistance value, the oscillators being coupled by a sub-harmonic injection technique and coding the output by their relative phase difference, the coupling resistance values being learnt during the training phase by using Hebbian learning rules. The method further comprises an operating phase wherein the trained oscillatory neuron network is used to recognize a pattern in an image, at least one of the training phase and the operating phase being computer-implemented.

According to further aspects of this method for recognizing a pattern which are advantageous but not compulsory, the method for recognizing might incorporate one or several of the following features, taken in any technically admissible combination:

the oscillators code their output as a binary value taking a first value and a second value different from the first value, the binary value being a first value when the relative phase difference is equal to a predetermined value and a second value when the relative phase difference is different from the predetermined value, the predetermined value being preferably equal to 0.

each interconnection only comprises elements chosen in the list consisting of a resistance, a capacitive element and an inductive element.

the capacitive element is a capacitor.

the inductive element a coil.

the oscillators are relaxation oscillators.

the circuitry comprises a coupling unit adapted to couple the oscillators by the sub-harmonic injection technique, the coupling unit comprising a respective NMOS transistor for each oscillator.

each NMOS transistor comprises a gate, the coupling unit further comprising a voltage source adapted to control the gate voltage of each NMOS transistor.

the training phase comprises the following steps: calculating vectors representative of the phase of each oscillator when the output of the oscillatory neuron network are different patterns, applying Hebbian learning rules to the vectors, to obtain Hebbian coefficients and converting the Hebbian coefficients into coupling resistance values by using a converting function.

the operating phase comprises the following steps: injecting an input deduced from the image in which a pattern is to recognize, collecting the waveform of each oscillator, obtaining phase differences between the oscillators, and recognizing a pattern in the image based on the calculated phase differences.

the step of injecting is carried out by determining the starting time of each oscillator, at least one starting time of the input being different from the corresponding starting time for which the image in which a pattern is to recognize.

each oscillator presents an oscillatory period, each starting time of the input differs from the corresponding starting time for which the image in which a pattern is to recognize by less than 50% of the oscillatory period of the oscillators.

The specification also relates to a computer program product comprising computer program instructions, the computer program instructions being loadable into a data-processing unit and adapted to cause execution of the method as previously described when run by the data-processing unit.

The specification further describes a computer-readable medium comprising computer program instructions which, when executed by a data-processing unit, cause execution of the method as previously described.

BRIEF DESCRIPTION OF THE DRAWINGS

The invention will be better understood on the basis of the following description which is given in correspondence with the annexed FIGURES and as an illustrative example, without restricting the object of the invention. In the annexed FIGURES:

FIG. 2 is a flowchart illustrating an example of carrying out a method for recognizing at least one pattern in an image.

DETAILED DESCRIPTION OF SOME EMBODIMENTS

Description of the System

Figure 1:
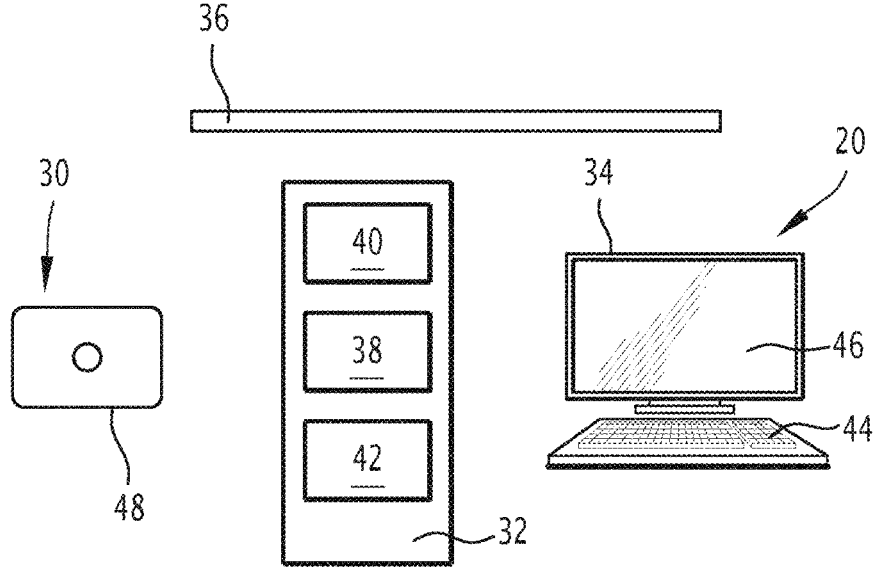
FIG. 1 is a schematic view of a system adapted to carry out a method for recognizing at least one pattern in an image.

A system 20 and a computer program product 30 are represented on FIG. 1. The interaction between the computer program product 30 and the system 20 enables to carry out a method for recognizing at least a pattern in an image as will be described later. Such method for recognizing is named "recognizing method" in the remainder of the specification.

This recognizing method is a computer-implemented method.

The system 20 is a desktop computer. In variant, the system 20 is a rack-mounted computer, a laptop computer, a tablet computer, a PDA or a smartphone.

In specific embodiments, the system is adapted to operate in real-time and/or is an embedded system, notably in a vehicle such as a plane.

In the case of FIG. 1, the system 20 comprises a calculator 32, a user interface 34 and a communication device 36.

The calculator 32 is electronic circuitry adapted to manipulate and/or transform data represented by electronic or physical quantities in registers of the calculator 32 and/or memories in other similar data corresponding to physical data in the memories of the registers or other kinds of displaying devices, transmitting devices or memoring devices.

As specific examples, the calculator 32 comprises a single core or multicore processor (such as a CPU, a GPU, a microcontroller and a DSP), a programmable logic circuitry (such as an ASIC, a FPGA, a PLD and PLA), a state machine, gated logic and discrete hardware components.

The calculator 32 comprises a data-processing unit 38 which is adapted to process data, notably by carrying out calculations, memories 40 adapted to store data and a reader 42 adapted to read a computer readable medium.

The user interface 34 comprises an input device 44 and an output device 46.

The input device 44 is a device enabling the user of the system 20 to input information or command to the system 20.

In FIG. 1, the input device 44 is a keyboard. Alternatively, the input device 44 is a pointing device (such as a mouse, a touch pad and a digitizing tablet), a voice-recognition device, an eye tracker or a haptic device (motion gestures analysis).

The output device 46 is a graphical user interface, which is a display unit adapted to provide information to the user of the system 20.

In FIG. 1, the output device 46 is a display screen for visual presentation of output. In other embodiments, the output device is a printer, an augmented and/or virtual display unit, a speaker or another sound generating device for audible presentation of output, a unit producing vibrations and/or odors or a unit adapted to produce electrical signal.

In a specific embodiment, the input device 44 and the output device 46 are the same component forming man-machine interfaces, such as an interactive screen.

The communication device 36 enables unidirectional or bidirectional communication between the components of the system 20. For instance, the communication device 36 is a bus communication system or an input/output interface.

The presence of the communication device 36 enables that, in some embodiments, the components of the system 20 be remote one from another.

The computer program product 30 comprises a computer readable medium 48.

The computer readable medium 48 is a tangible device that can be read by the reader 42 of the calculator 32.

Notably, the computer readable medium 48 is not transitory signals per se, such as radio waves or other freely propagating electromagnetic waves, such as light pulses or electronic signals.

Such computer readable storage medium 48 is, for instance, an electronic storage device, a magnetic storage device, an optical storage device, an electromagnetic storage device, a semiconductor storage device or any combination thereof.

As a non-exhaustive list of more specific examples, the computer readable storage medium 48 is a mechanically encoded device such a punchcards or raised structures in a groove, a diskette, a hard disk, a ROM, a RAM, an EROM, an EEPROM, a magnetic-optical disk, a SRAM, a CD-ROM, a DVD, a memory stick, a floppy disk, a flash memory, a SSD or a PC card such as a PCMCIA.

A computer program is stored in the computer readable storage medium 48. The computer program comprises one or more stored sequence of program instructions.

Such program instructions when run by the data-processing unit 38, cause the execution of steps of any method that will be described below.

For instance, the form of the program instructions is a source code form, a computer executable form or any intermediate forms between a source code and a computer executable form, such as the form resulting from the conversion of the source code via an interpreter, an assembler, a compiler, a linker or a locator. In variant, program instructions are a microcode, firmware instructions, state-setting data, configuration data for integrated circuitry (for instance VHDL) or an object code.

Program instructions are written in any combination of one or more languages, such as an object oriented programming language (FORTRAN, C"++, JAVA, HTML), procedural programming language (language C for instance).

Alternatively, the program instructions is downloaded from an external source through a network, as it is notably the case for applications. In such case, the computer program product comprises a computer-readable data carrier having stored thereon the program instructions or a data carrier signal having encoded thereon the program instructions.

In each case, the computer program product 30 comprises instructions, which are loadable into the data-processing unit 38 and adapted to cause execution of steps of any method described below when run by the data-processing unit 38. According to the embodiments, the execution is entirely or partially achieved either on the system 20, that is a single computer, or in a distributed system among several computers (notably via cloud computing).

Operating of the System

The operating of the system 20 is now described in reference to FIG. 2, which is a flowchart illustrating an example of carrying out the recognizing method.

The method for recognizing aims at identifying one or several patterns in an image.

For instance, it can be recognized an animal in a photo or a number/letter in a text. The animal, the number or the letter are examples of pattern.

The recognizing method comprises two phases: a training phase and an operating phase.

The training phase is a phase wherein an oscillatory neuron network is trained.

In the present case, the oscillatory neuron network is adapted to output a pattern when an image is inputted.

A neuron network is a mathematical function that is implemented by a physical circuit.

A neuron network is a set of neurons 50 linked by synapses 52.

As a specific example, two neurons 50 and a synapse 52 connecting said two neurons are represented A synaptic weight is associated with each synapse 52. It is often a real number, which takes both positive and negative values. In some cases, synaptic weight is a complex number.

A neuron network is an oscillatory neuron network when the neurons 50 are oscillators.

Unlike any other neural network such as the most commonly used spiking neural network (most often simply named SNN), in oscillatory neuron networks, the information is computed in the frequency domain rather than the time domain. By describing neurons 50 as oscillators, it is the phase difference between oscillating neurons that enables to encode information rather than in voltage amplitude versus time as in spiking neural network.

This means that oscillatory neuron networks are coupled oscillators with distinctive phase differences. The output is encoded on the phase differences to represent either in-phase (i.e. logic value 0) or out-of-phase (i.e. logic value 1). It can be shown that neurons 50 converge to a phase-locked pattern when neurons 50 oscillate with the same or subharmonic frequencies.

In such case, same or subharmonic frequencies are obtained by using a frequency injection locking technique. Distinctive phase relations are obtained by the synchronization of the coupling network dynamics. Phase differences correspond to the memorized patterns in the network.

Figure 3:
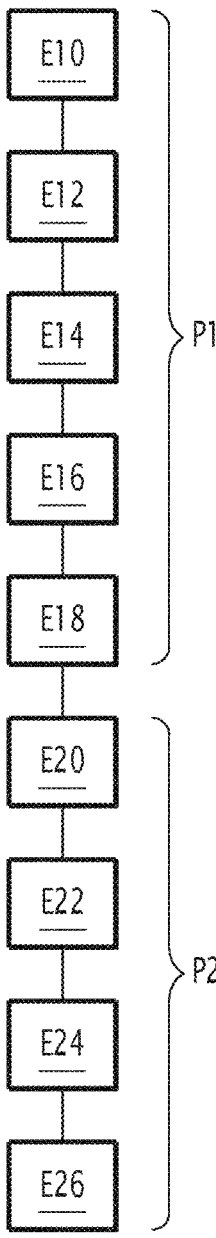
FIG. 3 is a schematic view of a part of an example of oscillatory neural network used in the method for recognizing of FIG. 2.

So far, the neurons 50 and the synapse 52 have been described mathematically as in the above part of FIG. 3. Now, they will be described physically in reference to the bottom part of FIG. 3 which illustrates part of a circuitry adapted to physically implement the oscillatory neuron network.

Each neuron 50 comprises an oscillator 54 and a control circuit 56.

The oscillator 54 is a relaxation oscillator.

A relaxation oscillator is adapted to generate an oscillating signal with exponential charge-discharge behaviour.

In the present example, each oscillator 54 is an oscillator based on a phase change material.

For instance, the phase change material is vanadium oxide $VO_2$.

In such case, the oscillator 54 acts as a hysteresis resistor with two states, insulating and metallic which changes phase around a critical temperature of 68° C.

More precisely, each oscillator 54 is a VO₂ device with two terminals, one being connected to a potential named $V_{DD}$ in what follows.

Such device has a 50 nanometers thick layer of VO₂ that is grown on top of 1 micrometer (μm) thermal SiO₂ on silicon substrate. A two-terminal device is realized by etching rectangles into the VO₂ and by depositing two Ni/Au contacts at both ends. The size of the VO devices has 0.2 μm channel length and 1 μm channel width. The resistivity of the VO₂ in the insulator state was of $\rho_{ins}$=10 Ω·cm, while in the metallic state the resistivity of the VO₂ was of $\rho_{met}$=0.8 Ω·cm.

It should be noted that oscillations happen when the voltage across the oscillator 54 increases above a threshold voltage, $V_t h$ and the VO₂ changes from insulating to metallic state with resistance $R_{met}$. When the voltage decreases below a lower threshold voltage, $V_H$, the VO₂ changes back to the insulating state with resistance $R_{ins}$.

Alternatively, other technologies can be used to achieve each oscillator 54 since any nonlinear oscillator with hysteresis can be used in this context.

The control circuit 56 is in series with the oscillator 54.

The control circuit 56 comprises a transistor 58, a capacitor 60 and a voltage source 62.

In the present case, the transistor 58 is a metal-oxide-semiconductor field-effect transistor. Such kind of transistor is often named by using the abbreviation MOSFET.

According to this example, the transistor 58 is a NMOS transistor, that is a n-type MOSFET.

The transistor 58 comprises a gate 58G, a source 58S and a drain 58D.

The drain 58D of the transistor 58 is connected to a terminal 64 of the oscillator 54 and the source 58S of transistor 58 is connected to the ground.

Similarly, the capacitor is connected on the one hand to the same terminal 64 of the oscillator 54 and on the other hand to the ground.

The capacitor 60 is therefore connected between the source 58S and the drain 58D of the transistor 58.

The capacitance of the capacitor 60 is named Cp.

The voltage source 62 is connected to the gate 58G of transistor 58.

The voltage source 62 is thus adapted to control the transistor 58 and thereby the voltage applied to the oscillator 54.

The assembly of control circuits 56 form a coupling unit adapted to couple the oscillators by a sub-harmonic injection technique.

Injection locking (IL) is an attractive phenomenon in non-linear coupled oscillators in which it can trigger frequency locking among oscillators. When an external signal is applied to an oscillator, the oscillator locks on to the external signal frequency whose frequency is close to the oscillators natural frequency, also termed as fundamental harmonic IL. It is also possible for an oscillator to lock at a frequency that is an exact sub-multiple frequency of the externally applied signal—or sub-harmonic injection locking.

In practice, the voltage source 62 injects a sinusoidal signal which enables oscillators 54 to lock in the same frequency which could be either the natural frequency of the oscillators 54 or a subharmonic frequency of oscillators 54. Subharmonic injection is used only to lock oscillators 54 in the same frequency. Once oscillators 54 are locked, the phase difference between signals is measured. The information is encoded on the phase difference of signals. If signals have 0-degree phase difference, this is a logic 0 (or white), if the signals have 180-degree phase difference, this is a logic 1 (or black).

In other words, the oscillators 54 are coupled by a sub-harmonic injection technique and coding the output by their relative phase differences.

As also apparent on FIG. 3, each synapse 52 is an interconnection 64.

Each interconnection 64 between each oscillator 54 comprises at least one coupling resistance 66 having a coupling resistance value $R_C$.

In some embodiments, each interconnection 64 also comprises a capacitive element, such as a capacitor, or an inductive element.

In the case of FIG. 3, the interconnection 64 comprises a resistance 66 and a capacitor 68 whose capacitance is Cc.

The capacitor 68 is in parallel with the resistance 66.

The Applicant has shown that the coupling between oscillators 54 and thus the synapse weighting depends from three parameters, which are the capacitive value, the resistance value and the switching input delays.

In what follows, the capacitive coupling is set to 0.05 pF for all interconnexions while the resistance coupling is varied to represent weak or strong coupling.

Qualitatively, small resistance values correspond to oscillators which are in-phase but with large coupling resistances, oscillators turn out-of-phase.

The Applicant has also shown that the output phase relations depends from the coupling resistive values and the switching input delay of oscillators.

Initialization is the switching input delay of oscillators. At first glance, one can think to start all the oscillators to switch at the same time, but this leads to incorrect or even chaotic oscillatory neural network dynamics. Therefore, the initialization of oscillators plays an important role in the oscillatory neural network dynamics as it represents the input test pattern. Thus, initialization of oscillators switching time represents the phases of the encoded test pattern.

For the specific case of two-coupled oscillators, the first oscillator switches at $T_1$=0, and the second oscillator switches at $T_2$=714 nanoseconds (ns) representing 50% of oscillator period $T_{osc}$ and corresponding to an input test pattern of phase of 0° for the first oscillator and 180° for the second oscillator. In other words, white pixel for the first oscillator and black pixel for the second oscillator. Hence, the switching time initialization of oscillators have to be set as an input switching delay SW as a fraction of the oscillator period (0 to 50% $T_{osc}$) corresponding to an input.

In other words, the switching delay is the difference between the starting time of one oscillator 50 and another one.

Training the oscillatory neuron network is finding appropriate weight values for the resistive coupling values of the oscillatory neuron network for a given application (here finding the pattern).

In the present example, the fixed parameters are the voltage applied to each oscillator 54.

The varying parameters are coupling resistance values and the starting time of the oscillators 54 (the time to initialize oscillators 54 when applying SHIL).

The training phase comprises several steps, which are a receiving step, a building step, a computing step, a converting step and an obtaining step.

During the receiving step, the system 20 receives patterns to learn and an initial oscillatory neuron network to learn.

Concerning the patterns, the system 20 receives images comprising a pattern to learn.

It is assumed, for the present example, that the patterns are black-and-white patterns.

In the following, the number of received patterns is named m.

Each received patterns can thus be indexed by an integer k comprised between 1 and m.

The number of stored patterns vary with the size of the oscillatory neuron network, since a large oscillatory neuron network can store more patterns than a small neuron network.

Concerning the initial oscillatory neuron network, the system 20 receives the structure of the oscillatory neuron network, that is the number/nature of oscillators 54 linked by interconnections 64 and control circuits 56.

In general, the number of oscillators 54 is the number of pixels of the patterns, the oscillators 54, the interconnections 64 and the control circuit 56 are identical and the interconnections 64 link each oscillator 54 together (one oscillator 54 is linked to each other oscillator 54).

Hereinafter, the number of oscillators 54 of the oscillatory neuron network is named n.

Each oscillator 54 can thus be indexed by an integer i varying between 1 and n.

During the building step, the system 20 builds a training data set based on the received patterns.

The training data set will be used to train the initial oscillatory neural network.

Such training data set is obtained by vectorising each received patterns to obtain vectors.

Each received image is represented in a vectorized form as:

$$\xi^k = \begin{pmatrix} \xi_1^k \\ \xi_2^k \\ \cdots \\ \xi_n^k \end{pmatrix}$$

In the previous expression, $$\xi_i^k$$

designates the oscillatory state of neuron i when the pattern is the pattern k. For example, if an oscillator is in-phase state then $$\xi_i^k = 1$$

and if an oscillator is out-of-phase state then $$\xi_i^k = -1.$$

In other words, each vector k is representative of the oscillatory neuron network obtained when using the pattern k as input.

This means that the combination of a pattern k (input) and the corresponding vector k (output) forms a piece of data of the data set.

During the computing step, the system 20 computes Hebbian coefficient of the oscillatory neural network by using Hebbian learning rules and the built data set.

Hebbian learning rules are rules enabling to determine how to alter the weights between model neurons.

In accordance with the Hebb model from which the Hebbian learning rules derive, the weight between two neurons increases if the two neurons activate simultaneously, and reduces if the two neurons activate separately.

In the present case, the Hebbian learning rules consists in computing the following formula:

$$c_{i,j} = \frac{1}{n} \sum_{k=1}^{m} \xi_i^k \overline{\xi_j^k}$$

In the previous expression, $c_{i,j}$ designates the Hebbian coefficient between a neuron i and another neuron j. A Hebbian coefficient can also be named as a connection matrix element by reference to the matrix that represents the Hebbian coefficients.

Such Hebbian coefficient corresponds to the fact that if two oscillators should oscillate in-phase such as $$\xi_i^k = \xi_j^k,$$

then their phase difference is zero, and if $$\xi_i^k = -\xi_j^k$$

this means that the two oscillators are out-of-phase.

More precisely, in the current case, a positive Hebbian coefficient corresponds to a white color pixel, a negative Hebbian coefficient corresponds to a gray color and a Hebbian coefficient which is equal to 0 to a black color.

In the expression of the Hebbian coefficient, $\overline{X}$ designates the conjugate of X.

At the end of the computing step, a connection matrix with computed Hebbian coefficients is obtained.

During the converting step, the system 20 converts each computed coefficients into resistance coupling values.

For this, the system 20 applies a converting function to the computed coefficients.

The converting function is, for instance, obtained by a measurement for specific coupling values on a system of two-coupled oscillators, respectively named first oscillator and second oscillator, with specific hypothesis.

In the present case, it is assumed that each oscillator is identical and presents the same oscillator period.

It is also assumed that if the first oscillator switches at a first time, the second oscillator switches at a second time which is half the oscillator period after the first time.

Under such hypothesis, one enters a value for the coupling value and obtain the phase difference between the two oscillators.

Since a phase difference of zero corresponds to the fact that the oscillators 1 and 2 are in the same oscillatory state and a phase difference of 180° corresponds to the fact that the oscillators 1 and 2 are in an opposite oscillatory state.

This means that knowing the coupling values, it is possible to determine the oscillatory states of the neurons.

In the present case, it is assumed that the capacitor value is fixed, so that the converting function converts the computed coefficients into the resistance values of the coupling interconnections.

More specifically, as only black or white patterns are used, non-complex Hebbian coefficients are used and in the present experiment, coefficients for out-of-phase encoding (or black) correspond to a resistance value comprised between 30 kΩ to 100 kΩ and coefficients for in-phase (or white) encoding correspond to a resistance value comprised between 1 kΩ and 30 kΩ.

At the end of the converting step, it is thus obtained a trained oscillatory neuron network.

The operating phase is a phase wherein the trained oscillatory neuron network is used to recognize a pattern in an image.

In the present example, the operating phase comprises an injecting step, a collecting step, a calculating step and a recognizing step.

During the injecting step, an initialization image (input) is determined based on the pattern to recognize.

Such initialization image can be a fuzzy pattern.

Such initialization image enables to determine the switching time of each oscillator.

At least one starting time of the initialization image is different from the corresponding starting time for which the image in which a pattern is to recognize.

As a specific example, each starting time of the input differs from the corresponding starting time for which the image in which a pattern is to recognize by less than 50% of the oscillatory period of the oscillators.

In the case of three-coupled oscillators detailed below in the experimental section, it will appears that only the second starting time differs.

During the collecting step, the system 20 collects the oscillator waveforms.

During the obtaining step, the system 20 calculates phase differences between the oscillator waveforms and the phase of the corresponding oscillator of the trained oscillator neural network.

For this, an oscillator 50 servers as a reference and the phase differences are obtained with respect to said oscillator 50.

During the recognizing step, the system 20 recognizes a pattern in the image based on the calculated phase differences.

In the present case, the operating phase is carried out by the system 20 by using simulations of the circuitry. But it can be considered to fabricate the circuitry and measure physically the elements.

The present method is therefore a pattern recognition flow for oscillatory neuron network based on the sub-harmonic injection locking method applied with Hebbian learning rules.

By intertwining the SHIL method with Hebbian learning rules, the Applicant has developed an oscillatory neuron network circuitry that allows oscillators to collectively lock in frequency (sub-multiple of input $V_G$ frequency) with distinctive phase relations. Determining the coupling weights via Hebbian learning rules together with injection locking adds plasticity to the oscillatory neuron network circuitry, in a sense the circuitry can change its own parameters in order to learn the frequencies of the periodic input signal. The interest in combining injection locking with Hebbian learning is that the whole learning process is dynamic and does not require any external signal processing. It means that oscillatory neuron network can adapt its frequency to any periodic input.

Furthermore, the resources involved are relatively low compared to other techniques, such as CMOS one since the calculation burden is quite low.

The method is thus a method for recognizing a pattern in an image involving less resources.

EXPERIMENTAL SECTION

Example 1: Three Coupled Oscillators

To illustrate the phase dynamics in an oscillatory neuron network for pattern recognition, the Applicant has studied three-coupled oscillators where all oscillators are identical. The list of parameters used are as in Table I, which is reproduced below:

| Parameter | Value |
| --- | --- |
| $V_{DD}$ | 2.5 V |
| $V_G$ | 2.5 V peak-to-peak (1.25 V DC) |
| $T_{osc}$ | 1/700 kHz |
| $R_{ins}$ | 100.2 kΩ |
| $R_{met}$ | 0.99 kΩ |
| $V_H$ | 1 V |
| $V_{th}$ | 1.99 V |
| $C_P$ | 100 pF |
| $C_C$ | 0.05 pF |
| $R_C$ | vary from 1 kΩ to 1 MΩ |

Figure 4:
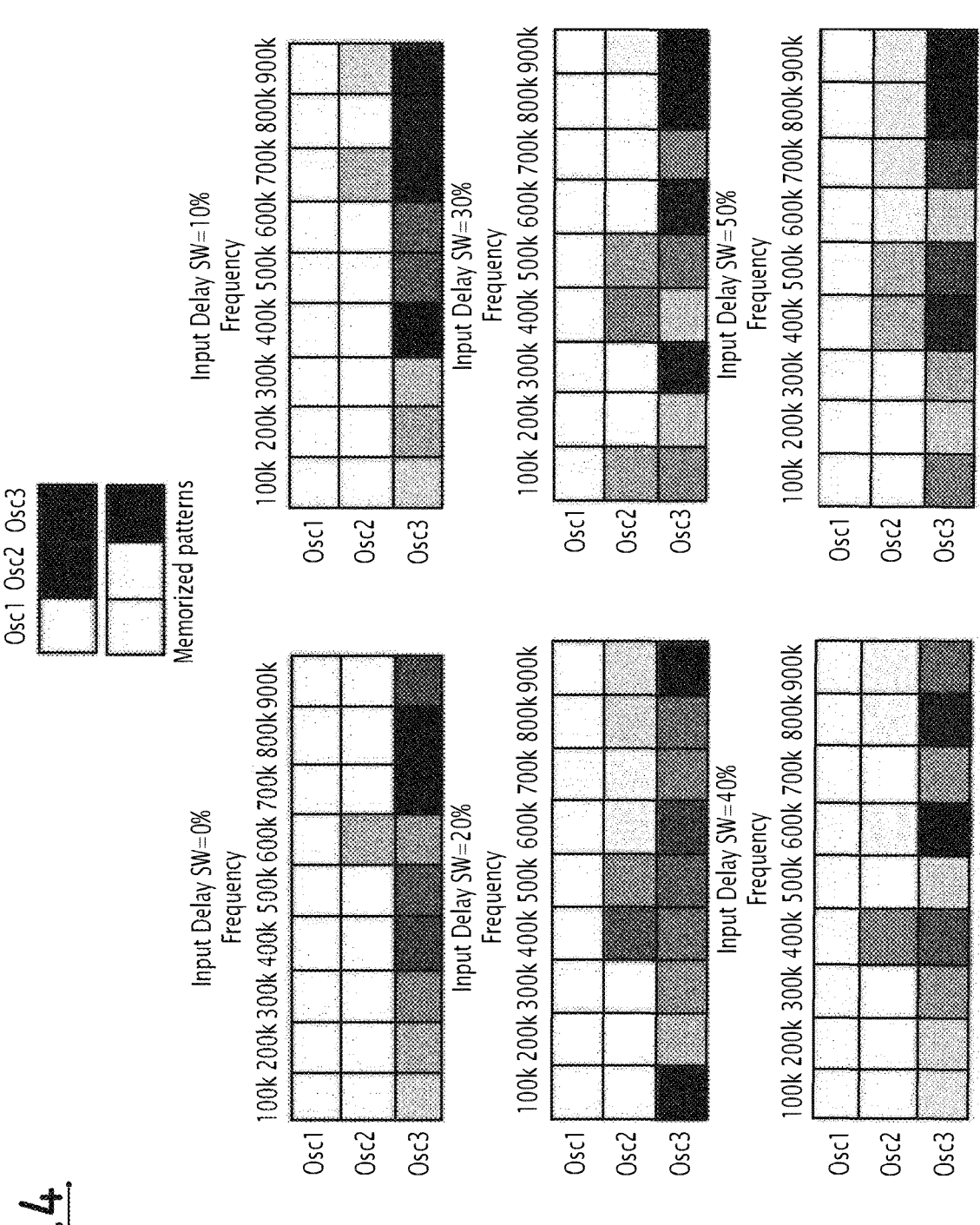
FIG. 4 is a schematic view of the results obtained in a first experiment.

There are two stored patterns (as shown on top of FIG. 4) and the Hebbian coefficients are derived as $c_{12}=0$, $c_{13}=-1$ and $c_{23}=0$ where white (in-phase) is encoded as '1' and black (out-of-phase) as '−1'. The Applicant has applied the same sinusoidal input signal to VG for each oscillator. Initialization is applied to all three oscillators such as first oscillator switches at T1=0, third oscillator switches at T3=50% $T_{osc}$, whereas the initialization of the second oscillator varies from 0% to 50% of $T_{osc}$. FIG. 4 shows the restored patterns while frequency tuning is applied using $V_G$ with frequency from 100 kHz to 900 kHz. As both $V_G$ frequency and switching delay are varied, the stored patterns are successfully retrieved for most of the cases.

Example 2: 10×6 Coupled Oscillators

Here, the Applicant has implemented a 10×6 oscillatory neural network. Five patterns are stored with the digits 0, 1, 2, 3 and 4 and parameters used as in Table I. By applying the Hebbian learning rule, the Applicant has obtained coefficients (with values −1 to 1) that were converted to resistance coupling values. The switching time of oscillators (or initialization) is applied such to represent the test pattern (or a fuzzy digit).

The applied $V_G$ sinusoidal input signal at each oscillator has a frequency of 1.2 MHz. Such frequency is chosen based on our preliminary assessment with $V_G$ frequency tuning from 200 kHz to 2 MHz. The applied frequency 1.2 MHz provides stable oscillations (not in chaotic regime); however, other suitable frequencies such as 900 kHz or 1 MHz can also be used.

The phase difference is computed relative to the first oscillator (top left-hand corner). This also explains that some restored images have inverse colour (white digit on black background) due to the phase difference with respect to the first oscillator.

Figure 5:
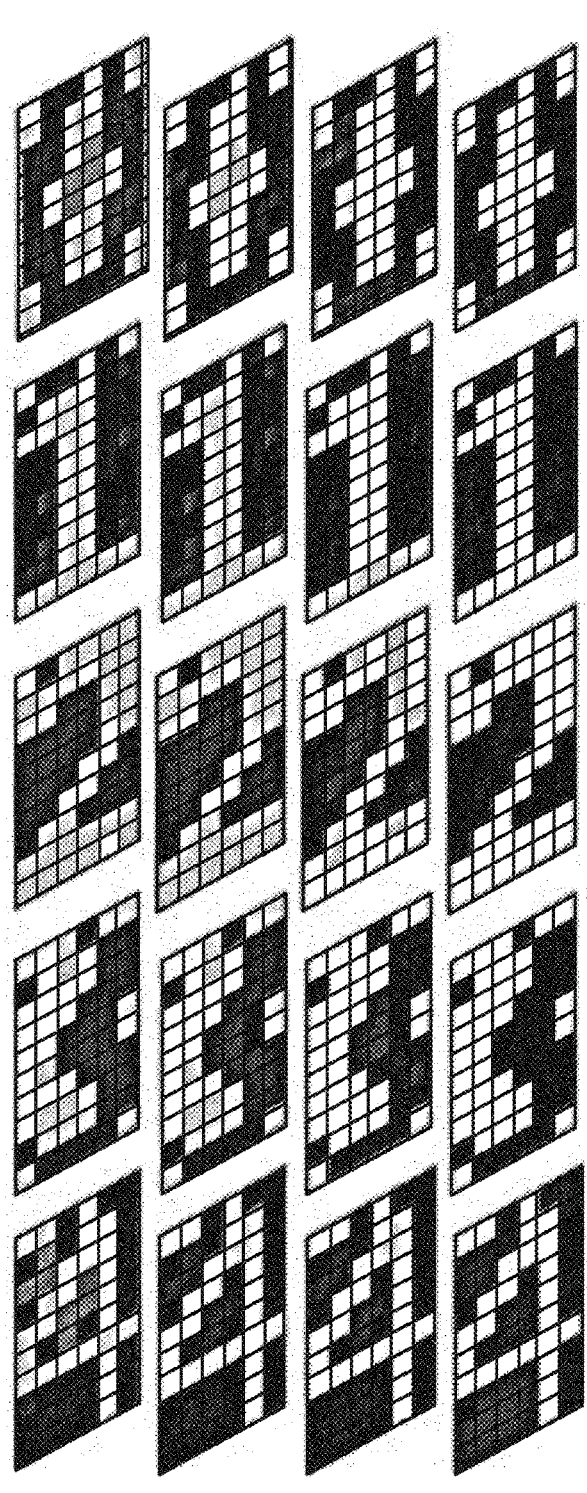
FIG. 5 is a schematic view of the results obtained in a second experiment.

Similarly, the Applicant has also investigated the other stored digits and their restored patterns, as shown in FIG. 5. Overall, Applicant has noticed that the memorized digits are restored, but there are still some oscillators that do not achieve a complete either in-/out-of-phase state. It appears that the proposed method of frequency locking with Hebbian learning rules show promising results in training 60 oscillators and restoring memorized patterns.

As a conclusion, the Applicant has shown that the phase dynamics of oscillators can be exploited to achieve pattern recognition with oscillatory neural networks. The Applicant has presented a new learning algorithm that leverages subharmonic injection locking and Hebbian learning rules to train oscillatory neural networks. Injecting a periodic input signal to the oscillators can be used to lock them in the same periodic or sub-periodic frequency, which can be used to compute phase differences among oscillators. To update coupling weights, Hebbian learning rules are applied and translate the obtained Hebbian coefficients into resistance coupling values. The value of resistive coupling varies as a function of the sign of Hebbian coefficients. The Applicant has shown that the new learning algorithm can recognize a large number of correlated input patterns based on phase difference among oscillators, and it displays a good recognition capability on various size of oscillatory neuron network.

The invention claimed is:

1. A method for recognizing a pattern in an image, the method comprising:
    a training phase of an oscillatory neuron network, to obtain a trained oscillatory neuron network, the oscillatory neuron network being adapted to output a pattern when an image is inputted, the oscillatory neuron network being implemented by a circuitry comprising oscillators linked by interconnections comprising at least one coupling resistance having a coupling resistance value, the oscillators being coupled by a subharmonic injection technique and coding the output by their relative phase difference, the coupling resistance values being learnt during the training phase by using Hebbian learning rules, and
    an operating phase wherein the trained oscillatory neuron network is used to recognize a pattern in an image,
    at least one of the training phase and the operating phase being computer-implemented,
    wherein the circuitry comprises a coupling unit adapted to couple the oscillators by the sub-harmonic injection technique, the coupling unit comprising a respective NMOS transistor for each oscillator, and
    wherein each NMOS transistor comprises a gate, the coupling unit further comprising a voltage source adapted to control the gate voltage of each NMOS transistor.

2. The method according to claim 1, wherein the oscillators code their output as a binary value, the binary value being a first value when the relative phase difference is equal to a predetermined value and a second value when the relative phase difference is different from the predetermined value.

3. The method according to claim 1, wherein each interconnection only comprises elements chosen in the list consisting of a resistance, a capacitive element and an inductive element.

4. The method according to claim 3, wherein the capacitive element is a capacitor.

5. The method according to claim 3, wherein the inductive element is a coil.

6. The method according to claim 1, wherein the oscillators are relaxation oscillators.

7. The method according to claim 1, wherein the training phase comprises the following steps:
    calculating vectors representative of the phase of each oscillator when the output of the oscillatory neuron network are different patterns,
    applying Hebbian learning rules to the vectors, to obtain Hebbian coefficients, and
    converting the Hebbian coefficients into coupling resistance values by using a converting function.

8. The method according to claim 1, wherein the operating phase comprises the following steps:
    injecting an input deduced from the image in which a pattern is to recognize,
    collecting the waveform of each oscillator,
    obtaining phase differences between the oscillators, and
    recognizing a pattern in the image based on the obtained phase differences.

9. The method according to claim 8, wherein the step of injecting is carried out by determining the starting time of each oscillator, at least one starting time of the input being different from the corresponding starting time for which the image in which a pattern is to recognize.

10. The method according to claim 9, wherein each oscillator presents an oscillatory period, each starting time of the input differs from the corresponding starting time for which the image in which a pattern is to recognize by less than 50% of the oscillatory period of the oscillators.

11. A non-transitory computer program product comprising computer program instructions, the computer program instructions being loadable into a data-processing unit and adapted to cause execution of the method according to claim 1 when run by the data-processing unit.

12. A non-transitory computer-readable medium comprising computer program instructions which, when executed by a data-processing unit, cause execution of the method according to claim 1.

* * * * *